(No Model.)

C. J. HARTLEY.
AUTOMATIC GRAIN WEIGHING MACHINE.

No. 368,946. Patented Aug. 30, 1887.

ATTEST
J. N. Bills
J. D. Walker

INVENTOR
Chas. J. Hartley
By L. B. Graham
his attorney

UNITED STATES PATENT OFFICE.

CHARLES J. HARTLEY, OF DECATUR, ILLINOIS, ASSIGNOR OF TWO-THIRDS TO JOHN K. WARREN AND BRADFORD K. DURFEE, BOTH OF SAME PLACE.

AUTOMATIC GRAIN-WEIGHING MACHINE.

SPECIFICATION forming part of Letters Patent No. 368,946, dated August 30, 1887.

Application filed February 18, 1887. Serial No. 228,062. (No model.)

*To all whom it may concern:*

Be it known that I, CHARLES J. HARTLEY, of the city of Decatur, county of Macon, and State of Illinois, have invented a certain new and useful Automatic Weighing Apparatus, of which the following is a specification.

The object of my invention is to accurately weigh a continuous flow of grain, and I attain my object by certain details of construction and combinations of parts, as hereinafter set forth and claimed.

Figure 1:
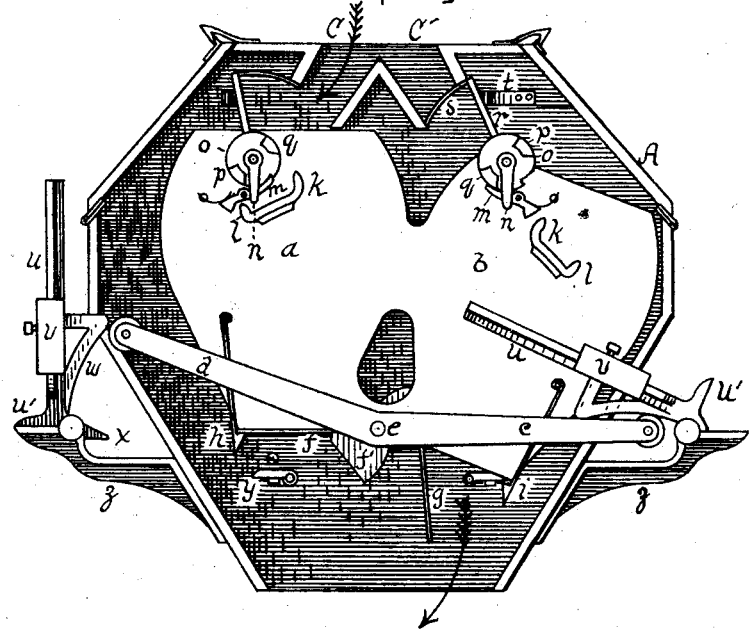
Figure 2:
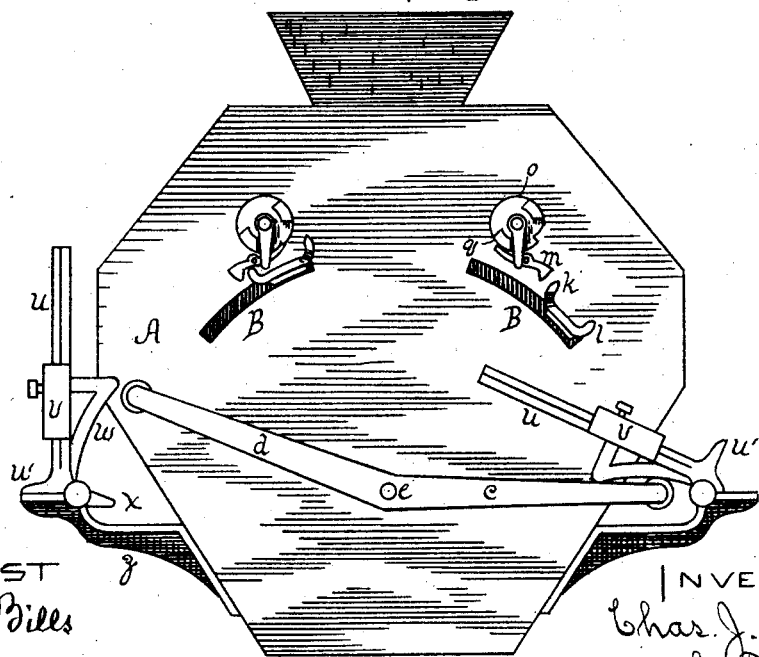

In the drawings accompanying and forming a part of this specification, Figure 1 is a side view of my device with a part of the casing removed, and Fig. 2 is a similar view with the casing intact.

$a$ and $b$ are grain-receptacles. $c$ is a scale-arm for receptacle $a$. $d$ is a scale-arm for receptacle $b$.

$e$ is the pivot to which the receptacles and scale-arms are rigidly secured.

$f$ is the swinging bottom for receptacle $a$, and $f'$ is a weight for said swinging bottom on the opposite side of the fulcrum thereof.

$g$ is the swinging bottom for receptacle $b$.

$h$ is a spring-catch for bottom $f$.

$i$ is a spring-catch for bottom $g$.

$k$ and $l$ are tappets on the receptacles.

$m$ are trip-pawls on the casing A.

$o$ are disks, provided each with lateral projections $p$ and $q$ and a peripheral ratchet-recess. The disks are rigidly mounted on pivot-pins that bear in casing A, and loosely mounted on the outer ends of the pivot-pins are arms $n$. Arms $r$ extend upwardly from the pivot-pins of the disks and support the cut-off plates $s$. Springs $t$ tend to hold the cut-off plates in chutes C C'.

$u$ are weight-levers pivotally supported in brackets $z$.

$u'$ are feet that enable the levers to maintain a vertical position.

$v$ are sliding weights on the levers.

$w$ are arc-formed bearings that rest, when the weight-levers are in operation, on the rollers in the ends of the scale-arms.

$x$ are trip projections that, operated by the rollers in their downward motion, throw the weight-levers off their balance and into operation.

$y$ represents a swinging stop that stands rigidly in the way of the beveled end of spring-catch $h$ when said catch is descending, and that swings out of the way of the upward motion thereof. The catches are placed one on each side of a receptacle, and the stops are pivoted on the interior of the casing in the relative positions indicated.

B are arc-formed slots in casing A, through which tappets $k$ $l$ project. The disks $o$, pawls $m$, and tappets $l$ are in the same plane and they coact to hold the cut-off plates clear of the chutes while their respective receptacles are receiving grain, and to permit the immediate closing of the chutes when the receptacles begin to descend preparatory to discharging their contents. Projections $p$ $q$, arms $n$, and tappets $k$ are in a common plane, and their function is to raise the cut-off plates clear of the chutes.

The grain fed to the device through a suitable hopper will, when the parts are in the position shown, follow the direction indicated by the upper arrow and pass into receptacle $a$. When a quantity sufficient to overcome the pressure of the weight-lever on arm $c$ is accumulated, the receptacle begins to descend, and simultaneously the tappet $l$ raises the pawl clear of the disk and permits the instantaneous operation of the cut-off plate. The catches of the receptacle strike the stops and are deviated sufficiently to release the bottom and permit the discharge of the grain, and the end of arm $d$ strikes the trip projection of the contiguous weight-lever and throws said lever in position to weigh the contents of receptacle $b$, which is now in position to receive the grain. The ascent of receptacle $b$ has of course been simultaneous with the descent of receptacle $a$, and its projection $k$ has pressed the arm $n$ against projection $q$ and carried the disk around until the pawl has caught the recess, so locking the cut-off plate clear of chute C'. The arm $c$ has raised the weight-lever into a vertical position on its bracket and all the conditions are precisely reversed, receptacle $b$ being in position to weigh grain, and receptacle a, with all its accessories, being entirely inoperative.

As shown in Fig. 1, the grain is supposed to be passing from receptacle b in the direction indicated by the arrow, and in consequence thereof the bottom g is shown open; but as soon as the weight of the grain is off the bottom said bottom will rise into position automatically, and, as before stated, the stops will swing clear of the upward motion of the catches that hold the bottom closed.

The receptacles are in unstable equilibrium, and so the balances are quickly broken. The loaded receptacle swings from its fulcrum, increasing its leverage, the weight-lever swings toward its fulcrum, decreasing its leverage, and so the momentum is rapidly accelerated, becoming practically irresistible by the time the impediments x y and the cut-off mechanism are reached. The trigger that releases the cut-off plate is lightly balanced and offers no perceptible obstruction to the motion of the receptacle. The position of the cut-off is such that there is no unconsidered grain falling when the scales begin to move. The motion of the plate is in unison with the flow of grain to the greatest extent possible, so reducing resistance to the minimum, and the time consumed in closing a chute after a trip-pawl has been thrown is not observable.

The amount discharged at each operation is regulated by the position of the weights on the levers, and either weight may be adjusted independently of the other, so making it possible to weigh with great accuracy.

A considerable time elapses between the closing of one chute and the opening of the other, and if through some mishap the stroke or downward motion of the loaded receptacle should not be completed no grain can escape. This will appear more forcibly when it is considered that the bottoms close automatically, that the flow of grain is completely arrested at the very first motion of a receptacle, and that neither the cut-off nor the bottom of the receptacle is opened until everything is in readiness for a succeeding operation.

I claim as new and desire to secure by Letters Patent—

1. The automatic weighing apparatus comprising two laterally-adjacent and rigidly-connected receptacles having oscillatory motion over a common pivot, a scale-arm for each receptacle, extended beyond the fulcrum thereof, and weight-levers resting on the outer ends of said arms, as and for the purpose set forth.

2. The automatic weighing apparatus comprising two laterally-adjacent and rigidly-connected receptacles having oscillatory motion over a common pivot, a scale-arm for each receptacle extended beyond the fulcrum thereof, and weight-levers resting on the arms when in operation and standing erect and clear of the arms when not in operation, as set forth.

3. The automatic weighing apparatus comprising two laterally-adjacent receptacles having a common oscillatory motion and provided each with a swinging bottom that closes automatically, catches that hold the bottoms closed while the receptacles are filling and that strike obstructions and release the bottoms as said receptacles swing downward, chutes diverging from a common source to the positions maintained by the receptacles when receiving grain, cut-off plates in the chutes adapted to be closed and opened by the oscillation of the receptacles, and a scale-arm with suitable weight connected with each receptacle and extended on the opposite side of the fulcrum thereof, as and for the purpose set forth.

4. The receptacles, the chutes, the cut-off plates, the disks having lateral projections and peripheral catches, the pawls in plane with the disks, the arms in plane with the projections of the disks, the tappets on the receptacles in plane, one set with the pawls and the other set with the arms, bars connecting the disks with the cut-off plates, and springs for throwing said plates, as and for the purpose set forth.

5. Receptacles a b, arms c d, pivoting weight-levers u, having feet u', trip projections x, and arc-formed bearings w, and weights v, having longitudinal adjustment on the levers, as and for the purpose set forth.

CHARLES J. HARTLEY.

Attest:
JOHN K. WARREN,
B. K. DURFEE.